United States Patent

Shirokoshi

[11] Patent Number: 6,099,432
[45] Date of Patent: Aug. 8, 2000

[54] PLANETARY GEAR DEVICE HAVING A BACKLASH ADJUSTING MECHANISM

[75] Inventor: Norio Shirokoshi, Nagano-ken, Japan

[73] Assignee: Harmonic Drive Systems Inc., Tokyo, Japan

[21] Appl. No.: 09/149,160

[22] Filed: Sep. 4, 1998

[30] Foreign Application Priority Data

Sep. 9, 1997 [JP] Japan .................................. 9-243733

[51] Int. Cl.[7] .............................................. F16H 57/12
[52] U.S. Cl. ............................. 475/331; 74/409; 74/440
[58] Field of Search ..................... 74/409, 440; 475/331, 475/337, 348, 346

[56] References Cited

U.S. PATENT DOCUMENTS

| | | | |
|---|---|---|---|
| 2,966,070 | 12/1960 | Wise | 475/337 X |
| 4,020,716 | 5/1977 | Toth et al. | 475/333 X |
| 4,422,486 | 12/1983 | Maret | 475/332 X |
| 4,799,396 | 1/1989 | Ito | 475/346 X |
| 4,893,525 | 1/1990 | Gabor | 475/241 |
| 5,240,462 | 8/1993 | Mochizuki et al. | 74/409 X |
| 5,295,925 | 3/1994 | Hirabayashi | 475/337 X |
| 5,382,203 | 1/1995 | Bellman et al. | 475/331 |
| 5,409,430 | 4/1995 | Hashimoto et al. | 475/331 |
| 5,787,766 | 8/1998 | Blach | 74/409 X |

FOREIGN PATENT DOCUMENTS

| | | |
|---|---|---|
| 2-38551 | 3/1990 | Japan . |
| 2-283939 | 11/1990 | Japan . |
| 669020 | 2/1989 | Switzerland . |

*Primary Examiner*—Charles A Marmor
*Assistant Examiner*—Ankur Parekh
*Attorney, Agent, or Firm*—Rosenthal & Osha L.L.P.

[57] ABSTRACT

A planetary gear device 1 comprises a rear-stage planetary gear mechanism 30 having carrier parts 38, 39 constituting a divided-type carrier, wherein axial holes 81–84 of planetary shafts 71–74 fixed on the carriers 38, 39 can be accessed directly from the side of an outer end surface 39c of the output-side carrier part 39, and the both carrier parts 38, 39 can be twisted by gripping these carrier parts by making use of the axial holes, whereby backlash adjustment can be carried out from one side of the carrier parts without any difficulties. Further, since the carrier parts 38, 39 are supported via a common bearing member on a casing 2, center deviation between the carrier parts does not occur when they are twisted to adjust backlashes, whereby degradation of assembly accuracy can be prevented caused by the center deviation of the carrier parts.

2 Claims, 4 Drawing Sheets

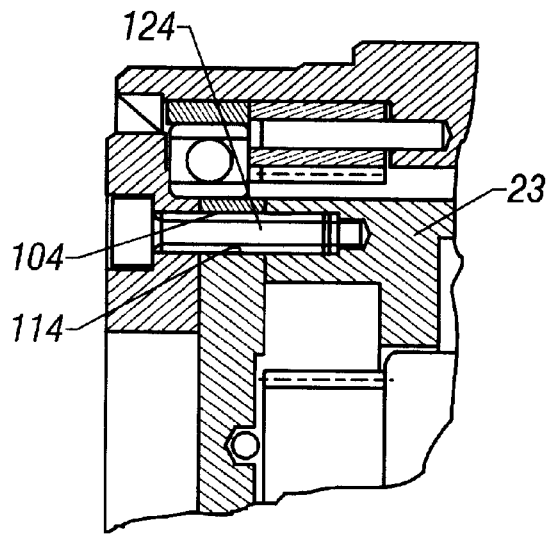
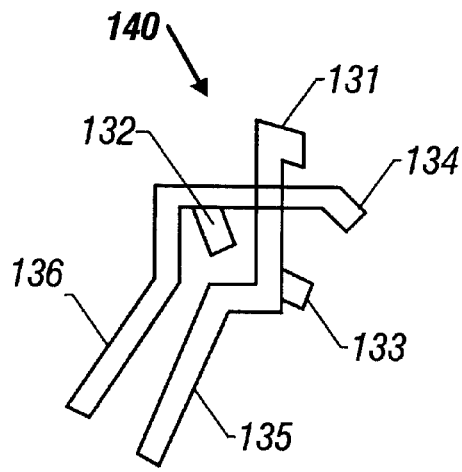
FIG. 3              FIG. 4
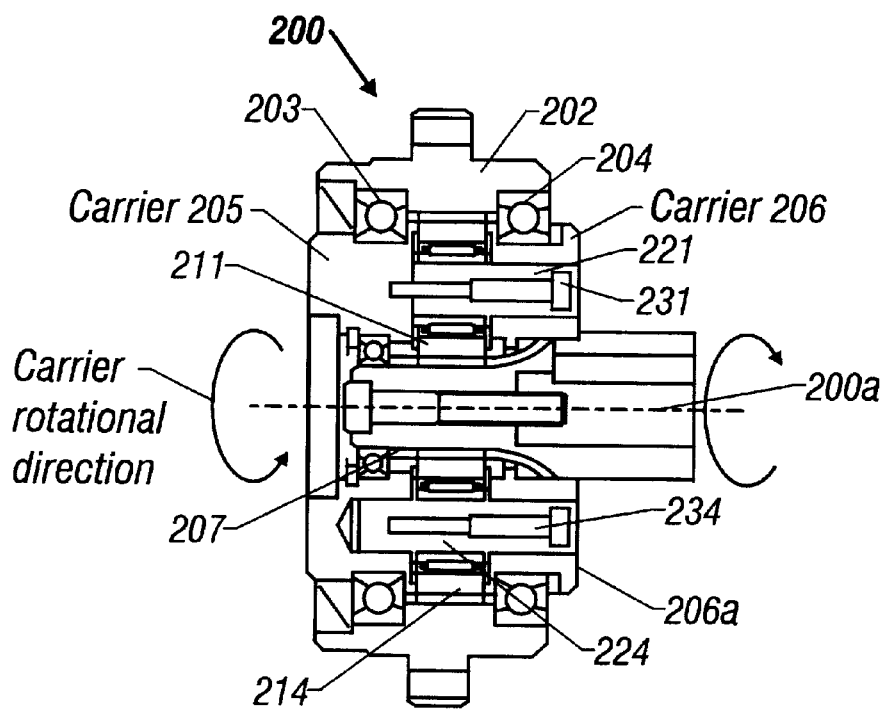
FIG. 5
*(Prior Art)*

PLANETARY GEAR DEVICE HAVING A BACKLASH ADJUSTING MECHANISM

BACKGROUND OF THE INVENTION

1. Technical Field

This invention relates to a planetary gear device having a backlash adjusting mechanism which is capable of adjusting backlashes between planetary gears and a sun gear and between the planetary gears and an internal gear by twisting divided-type carrier parts relatively with each other.

2. Prior Art Description

As like as other gear devices, planetary gear devices are also provided with backlashes between component gears in the consideration of interference of gears due to manufacturing errors, assembling errors, thermal expansion during operation and the like. This means that an input-side gear and an output-side gear have a play corresponding to the backlashes with respect to fixed gears with which they are engaged.

Several methods have been proposed to adjust or eliminate the backlashes between gears, one of which is such that a carrier supporting planetary gears is divided into two parts, planetary gears adjacent to each other in a circumferential direction are supported by the different divided carrier parts, and the both carrier parts are twisted relatively with each other to realize an engagement condition wherein the adjacent gears regulate the plays corresponding to the backlashes of the other gears with respect to each other.

A planetary gear device applied with the above method is disclosed in Japanese Utility Model Laid-open No. Hei 2-38551 and Japanese Patent laid-open No. Hei 2-283939, both assigned to the same assignee of this invention, for example. A backlash-elimination mechanism of the planetary gear device having relatively-rotatable carrier parts that are disclosed in the above publications will be explained briefly.

As shown in FIGS. 5 and 6(A), a planetary gear device 200 of this type is provided inside a cylindrical casing 202 with a first and a second carrier parts 205 and 206 of disk shape which are rotatably supported by ball bearings 203 and 204, respectively. Four planetary gears 211–214 are sandwiched between the first and second carrier parts 205 and 206. The first carrier part 205 has planetary shafts 221 and 223 of the planetary gears 211 and 213 positioned along a diametrical direction which are fixedly connected thereto by fastening bolts 231 and 233 and support the planetary gears 211 and 213, respectively. Likewise, the other carrier parts 206 has planetary shafts 222 and 224 of the remaining planetary gears 212 and 214 also positioned along a diametrical direction which are fixedly connected thereto by fastening bolts 232 and 234 and support the planetary gears 212 and 214.

The first and third planetary shafts 221 and 223 fixed to the first carrier part 205 is slightly movable with respect to the second carrier part in a circumferential direction about a device axial line 200a, while the planetary shafts 222 and 224 fixed on the second carrier part 206 is slightly movable with respect to the first carrier part 205 in a circumferential direction about the device axial line 200a.

Provided now that, as shown in FIG. 6(A), there occur backlashes in the clockwise direction of the planetary gears 211–214 (output element) with respect to the sun gear (input element). The both carrier parts 205 and 206 of this condition are twisted in opposite circumferential directions, which results in realizing an engaging condition as shown in FIG. 6(B). Then, the carrier parts 205 and 206 of this condition are fastened together by fastening bolts 231–234, so that a condition in which the backlashes are eliminated can be realized. Namely, in this condition, since the plays of the planetary shafts 221–224 in the clockwise direction are restricted by opposite tooth flanks of the planetary gears 212 and 214, the backlashes are eliminated.

In the thus constituted planetary gear device 200, when the carrier parts 205 and 206 are twisted relatively at the side of the carrier part 206, for example, in order to adjust backlashes, the carrier part 206 must be twisted with holding the opposite-side carrier part 205 not to rotate, prior to fastening of the fastening bolt 234. It is required for this operation to apply the carrier parts with forces from both sides of the axial direction (namely, from input and output sides). This operation cannot be carried out after the planetary gear device is mounted on a motor housing or other members.

Further, the carrier parts 205 and 206 are supported separately by the different ball bearings 203 and 204, and therefore, when the both carriers 205 and 206 are rotated relatively, misalignment of center axes between the carrier parts is likely to occur, and an accurate assembly cannot be expected, which is a problem.

An object of this invention is to provide a planetary gear device having a backlash adjusting mechanism which is able to a void the aforementioned defects.

SUMMARY OF THE INVENTION

In order to solve the above and other objects, according to this invention, there is provided a planetary gear device having a backlash adjusting mechanism which has a first carrier part supporting a first planetary g ear rotatably and a second carrier part supporting a second planetary gear rotatably, the first and second carrier parts being fixedly connected together by means of fastening bolts after the first and second carrier parts are twisted relatively to adjust backlashes of the first and second carrier parts with respect to a sun gear and an interna l gear, characterized in that:

the first and second carrier parts are arranged adjacent to each other in a device axial direction; and, planetary shafts of the first and second planetary gears are arranged so that they penetrate through the first and second carrier parts from a side of an outer end surface of the second carrier part, wherein the planetary shaft of the first planetary gear penetrates through the second carrier part in a loose condition while the planetary shaft of the second planetary gear penetrates through the first carrier part in a loose condition.

In the planetary gear device of this invention as constituted above, through holes for receiving the planetary shafts of the first and second planetary gears are exposed on the outer end surface of the second carrier part. Therefore, in a condition prior to attaching the fastening bolts, axial holes of the respective planetary shafts can be directly accessed from openings of the respective through holes. Accordingly, backlash adjustment for the both planetary gears can be carried out from the side of the outer end surface of the second carrier part in a manner, for example, that a gripping tool insertable into the axial hole of the planetary shaft of the first planetary gear is used to grip this planetary shaft so as not to rotate, and at the same time another gripping tool insertable into the axial hole of the planetary shaft of the second planetary gear is used to twist this planetary shaft about a device axial line la.

As mentioned above, according to this invention, the backlash adjustment can be carried out from one side of the planetary gear device different from the conventional backlash adjustment mechanism, whereby such operation can be carried out even after the planetary gear device is mounted on a motor housing or other members.

Next, according to this invention, in addition to the above constitution, the first and second carrier parts are rotatably supported on an inner circumferential surface of a device casing via a common bearing member in a manner that an inner race of the bearing member is fitted on bearing mounting surfaces formed on outer circumferential surfaces of the first and second carrier parts.

With this configuration, the both carrier parts are supported rotatably by means of the common bearing member, which can prevent occurrence of center deviation between the carrier parts when the carrier parts are twisted for backlash adjustment. It is therefor possible to avoid such a defect that assembly accuracy is degraded due to center deviation between the carrier parts during backlash adjusting operation.

BRIEF DESCRIPTION OF THE DRAWINGS

FIG. 3 is a partial sectional view of the planetary gear device of FIG. 1 taken along line 3—3.

FIG. 4 is an illustration showing an example of a gripping tool suitable for backlash adjustment.

FIG. 5 is a sectional view of a planetary gear device having a divided-type carrier.

DETAILED DESCRIPTION OF A PREFERRED EMBODIMENT

With reference to the drawings, a planetary gear device having a backlash adjusting mechanism will now be described.

Figure 1:
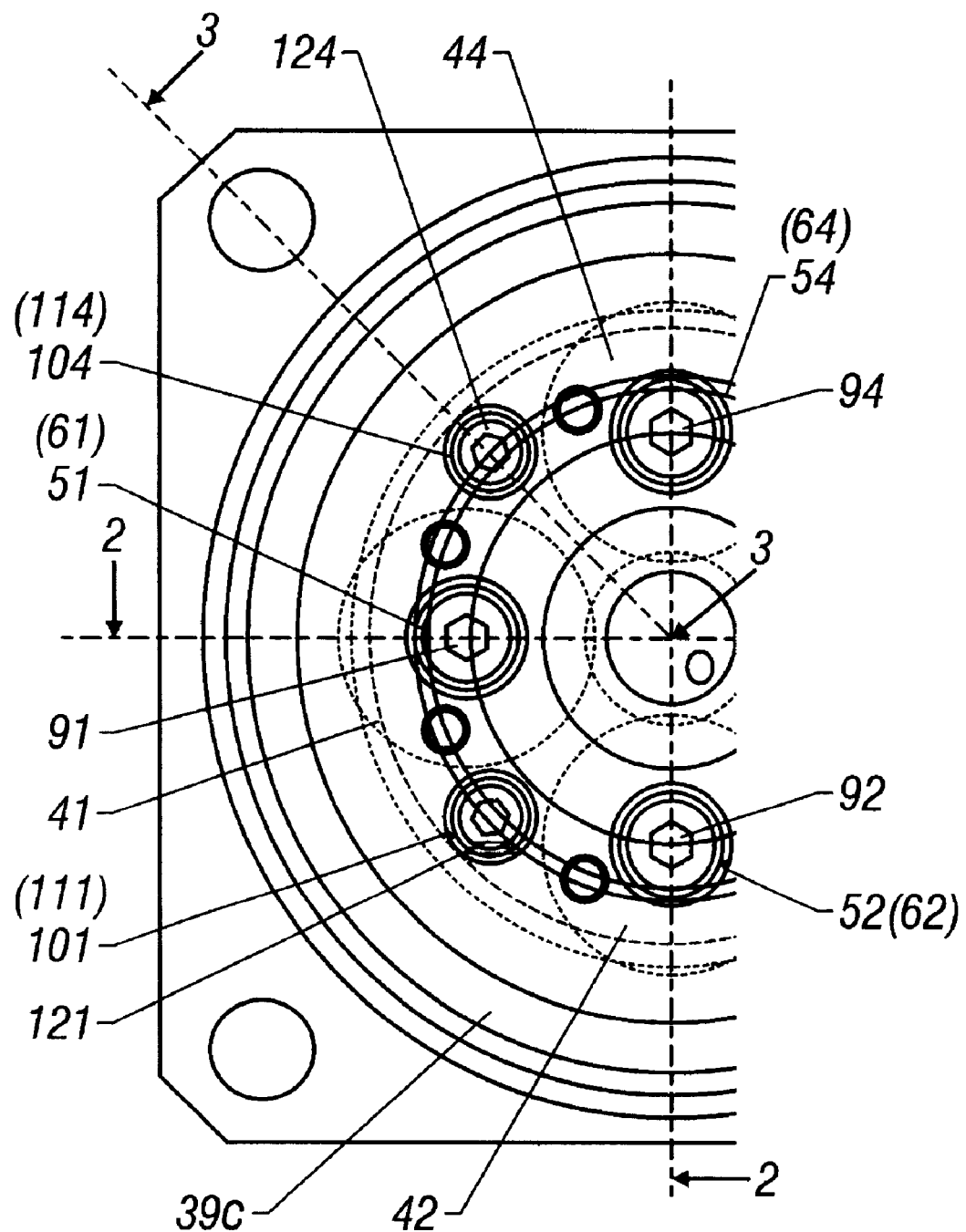
FIG. 1 is a partial end-surface view of a planetary gear device having a backlash adjusting mechanism when viewed from an output side thereof
Figure 2:
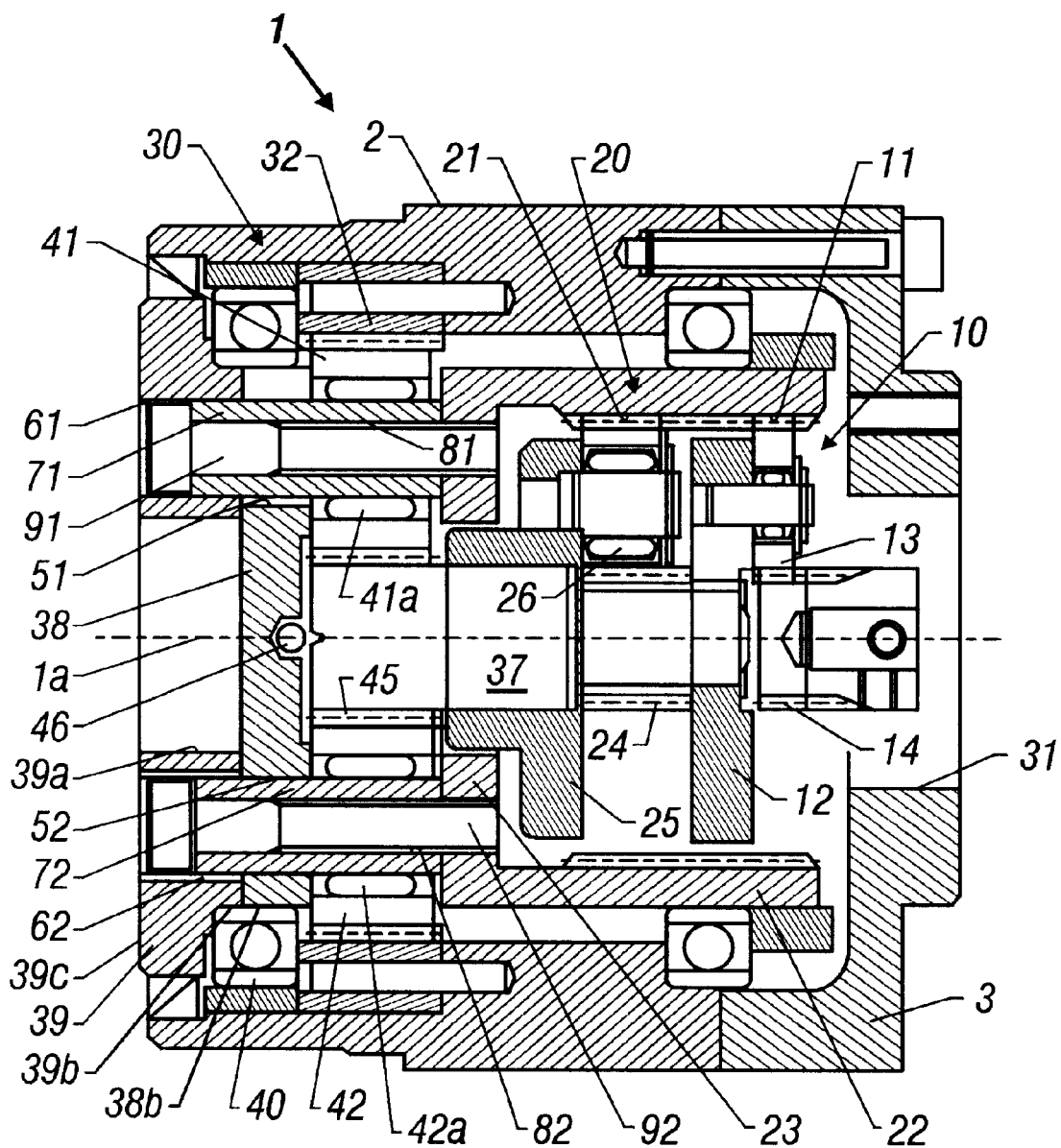
FIG. 2 is a sectional view of the planetary gear device of FIG. 1 taken along line 2—2.
Figure 6:
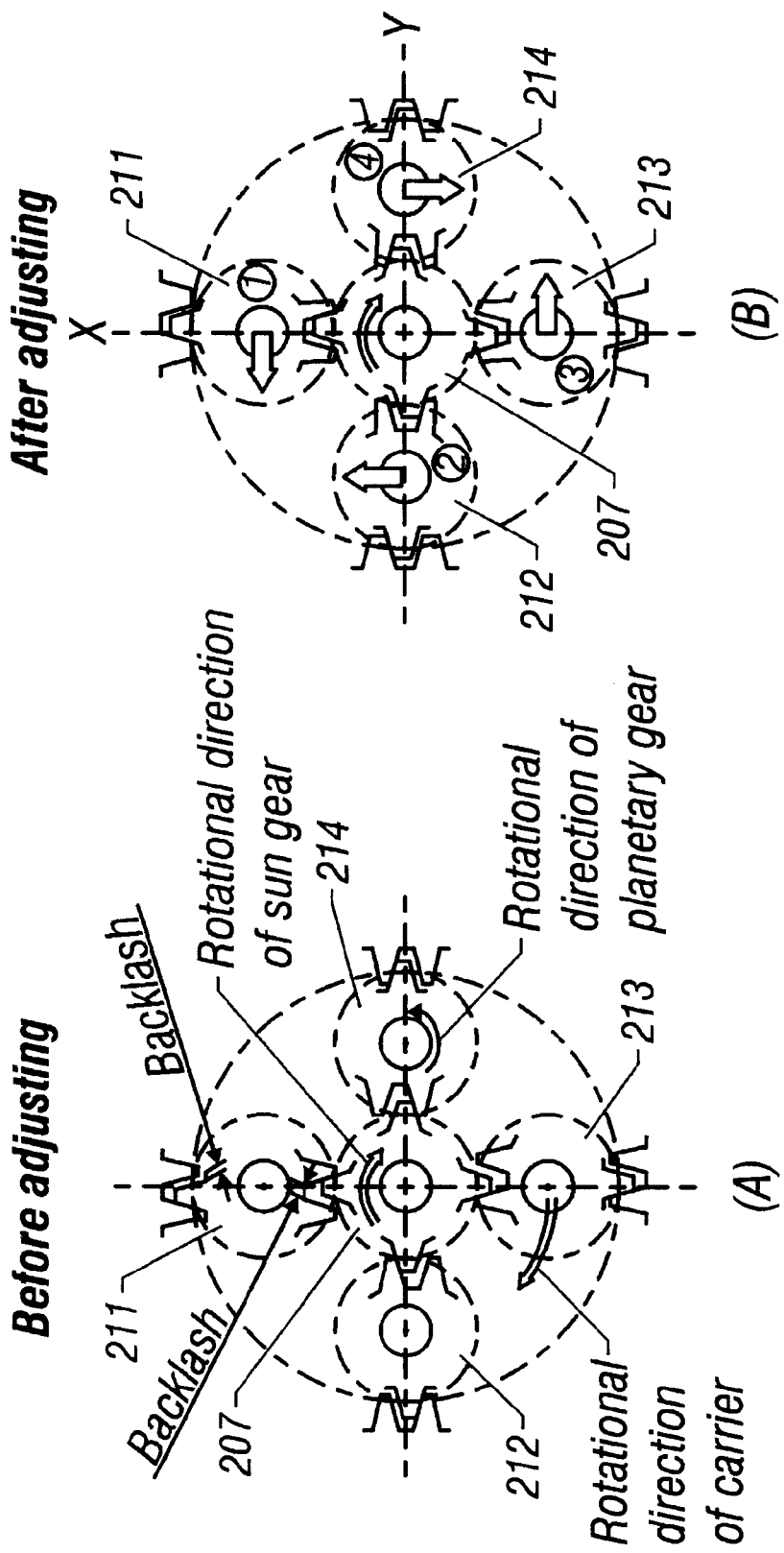
FIG. 6 is an explanatory view showing a backlash eliminating mechanism of the planetary gear device of FIG. 5.

A planetary gear device 1 shown in FIGS. 1 and 2 is a three-stage reduction device wherein a backlash adjusting mechanism according to this invention is applied to the final or rear stage planetary gear device. More specifically, the planetary gear device 1 is constituted to have a front-stage planetary gear mechanism 10, a middle-stage planetary gear mechanism 20 and a rear-stage planetary gear mechanism 30, these planetary gear mechanisms being accommodated in a cylindrical device casing 2. The rear-stage planetary gear mechanism 30 has a rear-stage internal gear 32 fixedly mounted on an inner circumferential surface of the casing 2 by means of insert pins 31, first to fourth rear-stage planetary gears 41–44 (the planetary gear 43 is not shown in the drawings) placed inside the internal gear 32, a rear-stage sun gear 45 formed on an outer circumferential surface of a pinion shaft 37 positioned at a center of the four planetary gears 41–44, and a divided-type carrier comprised by tow carrier parts 38 and 39.

The carrier parts 38 and 39 of the divided-type carrier are disc-shaped ones and arranged adjacent to each other along a device axial line 1a. The carrier part 39 positioned at one end of the device 1 is formed at a center thereof with a circular opening 39a. These carrier parts 38 and 39 are formed on their outer circumferential surfaces with bearing mounting surfaces 38b and 39b on which a common ball bearing 40 is mounted, that is, an inner race of the ball bearing 40 is fitted on the bearing mounting surfaces, whereby these carrier parts 38, 39 are supported by the casing 2 in a manner rotatably.

The carrier parts 38 and 39 are also formed with four through holes 51–54 and 61–64, respectively (among which those 53 and 63 are not shown in the drawings). The through holes 51–54 are positioned at an angular interval of 90 degrees along a circumferential direction of the carrier part 38. likewise, the through holes 61–64 are at the same angular interval of 90 degrees along a circumferential direction of the carrier part 39. Planetary shafts 71–74 of the rear-stage planetary gears 31–34 are inserted into the through holes 51–54 and 61–64, respectively, from the side of the outer end surface 39c of the carrier part 39. The planetary shafts 71–74 are formed at their center with axial holes 81–84, respectively, into which fastening bolts 91–94 are inserted. In the drawings, the planetary shafts 73, 74, the axial hole 83, and the fastening bolt 93 are not shown.

The first and third through holes 51 and 53 of the first carrier part 38 are designed to have an inner diameter so that the planetary shafts 71 and 73 penetrate therethrough in a loose manner or in a manner having a certain gap in a circumferential direction, while the second and fourth through holes 52 and 54 are to have an inner diameter so that the planetary shafts 72 and 74 penetrate therethrough in a fitted manner. On the other hand, at the side of the second carrier part 39, the respective through holes 61–64 are designed so that the second and fourth planetary shafts 72 and 74 penetrate through the through holes 62 and 64 in a loose manner or in a manner having a gap in a circumferential direction, while the first and third planetary shafts 71 and 73 penetrate through the holes 61 and 63 in a fitted manner.

The respective planetary shafts 71–74 have end portions projecting from an end surface of the first carrier 38, around which the first to fourth planetary gears 41–44 are supported rotatably via planetary-shaft bearings 41a–44a such as needle bearings. In the drawings, only the planetary-shaft bearings 41a, 42a and 44a are shown.

The internal gear 11 of the front-stage planetary gear mechanism 10 and an internal gear 21 of the middle-stage planetary gear mechanism 20 are formed on an inner circumferential surface of a cylindrical member 22. The cylindrical member 22 has a circular flange 23 which is disposed coaxially and in contact with the ends of the respective planetary shafts. The circular flange 23 is fixedly connected to the side of the planetary shafts 71–74 by means of the fastening bolts 91–94 projecting from the planetary shafts 71–74.

On the other hand, as shown in FIG. 3, the carrier parts 38 and 39 are formed with four bolt holes 101–104 and 111–114, respectively (only the bolt holes 101, 104, 111 and 114 are shown in the drawings). The bolt holes 101–104 and 111–114 are arranged on a same circle at angular positions offset from the through holes 51–54 and 61–64 by 45 degrees. Fastening bolts 121–124 are fastened into the bolt holes 101–104 and 111–114, whereby the carrier parts 38 and 39 are fastened together and are fixedly mounted on the circular flange 23. In the drawings, only the fastening bolts 121 and 124 are shown.

Next, the pinion shaft 37 disposed at the center of the casing 2 is supported at its end on the carrier part 38 rotatably via a thrust ball 46. The pinion shaft 37 is formed at the other end portion with a middle-stage sun gear 24 of the middle-stage planetary gear mechanism 20 facing to the internal gear 21 thereof. The middle-stage sun gear 24 engages with middle-stage planetary gears 26 supported rotatably by a middle-stage carrier 25 which is fixedly mounted on the outer circumferential surface of the pinion shaft 37.

The pinion shaft is fixedly connected at its end with a disc-shaped front-stage carrier 12 which supports front-stage planetary gears 13 rotatable The front-stage planetary gears 13 are engaged with the front-stage internal gear 11 at their radially outer sides with respect to the device axial line 1a, and with a front-stage sun gear 14 formed on an outer circumferential surface of an input pinion shaft 14 at their radially inner sides. The input pinion shaft 14 is connectable to an input-side shaft (not shown). In addition, an opening of the casing 2 at the side of the front-stage planetary gear mechanism 10 is closed by an end cover plate 3 having a center opening 31.

According to the planetary gear device 1 as constituted above, the backlash adjustment for the rear-stage planetary gear mechanism 30 can be carried out as follows. First, the fastening bolts 91–94 are removed from the planetary shaft 71–74. Then, a suitable gripping tool is attached to the axial holes 81–84 of the respective planetary shafts 71–74 exposing at the side of the outer end surface 39a of the carrier part 39, and is used to twist the first and second carrier parts 38 and 39 about the device axial line 1a in the opposite directions.

FIG. 4 is an example of a gripping tool suitable for carrying out the above operation. The shown gripping tool 140 comprises arms 135 and 136 which can be twisted in the opposite directions. The arm 135 has two pins 131 and 133 which can be inserted into the axial holes 81 and 83 of the planetary shafts 71, 73 of the first and third planetary gears 41 and 43, while the other arm 135 also has two pins 132 and 134 which can be inserted into the axial holes 82 and 84 of the planetary shafts 72 and 74 of the second and fourth planetary gears 42 and 44.

After the backlash of the rear-stage planetary gear mechanism 30 is adjusted by twisting the first and second carrier parts relatively, the four fastening bolts 121–124 are fastened so that the carrier parts are fastened together while maintaining the backlash being adjusted or eliminated. Thereafter, the fastening bolts 91–94 are fastened into the axial holes 81–84 of the respective planetary shafts.

As aforementioned, according to the planetary gear device having a divided-type carrier of this invention, the axial holes of the planetary shafts of the respective planetary gears can be accessed from the side of the outer end surface of one of the carrier parts. As a result, the both carrier parts can be gripped at one side thereof to twist in the opposite directions for adjusting backlashes of the planetary gear device. Hence, since there is no need to grip one of the carrier parts positioned at the opposite side so as not to rotate by making use of the fastening bolts as in the conventional device, the carrier parts can be twisted for backlash adjustment without any difficulties.

Further, according to the planetary gear device of this invention, the both carrier parts are rotatably supported by the device casing via the common bearing member fixedly mounted on the bearing mounting surfaces formed on the outer circumferential surfaces of these carrier parts. This can avoid occurrence of center deviation between the carrier parts when these carrier parts are twisted for backlash adjustment. Thus, it is possible to avoid degradation of assembly accuracy caused by the center deviation between the carrier parts.

What is claimed is:

1. A planetary gear device having a backlash adjusting mechanism which has a first carrier part rotatable supporting a first planetary gear and a second carrier part rotatably supporting a second planetary gear, the first and second carrier parts being fixedly connected together by means of fastening bolts after the first and second carrier parts are twisted relatively to adjust the backlashes of the first and second carrier parts with respect to a sun gear and an internal gear, wherein:

the first and second carrier parts are arranged adjacent to each other along a device axial line and have holes which receive planetary shafts of the first and second gears:

the second carrier part is positioned at an outer axial end of said planetary gear device, and the holes in the second carrier part extend completely through the second carrier part so that the planetary shafts are accessible from said outer axial end of said planetary gear device; the planetary shaft of the first planetary gear extends through a corresponding one of the holes in the second carrier part in a loose manner while the planetary shaft of the second planetary gear extends through a corresponding one of the holes in the first carrier part in a loose manner; and a plurality of fastening bolts are provided for fastening the first and second carrier parts together after the first and second carrier parts are twisted relative to each other about the device axial line.

2. A planetary gear device according to claim 1, wherein the first and second carrier parts are rotatably supported on an inner circumferential surface of a device casing via a common bearing member in a manner that an inner race of the bearing member is fitted on bearing mounting surfaces formed on outer circumferential surfaces of the first and second carrier parts.

* * * * *